O. CRUTCHFIELD.
FOLDING SLED.
APPLICATION FILED AUG. 16, 1911.
1,013,132.
Patented Jan. 2, 1912.
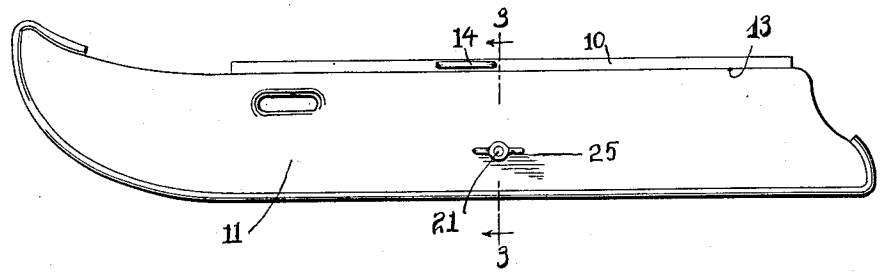
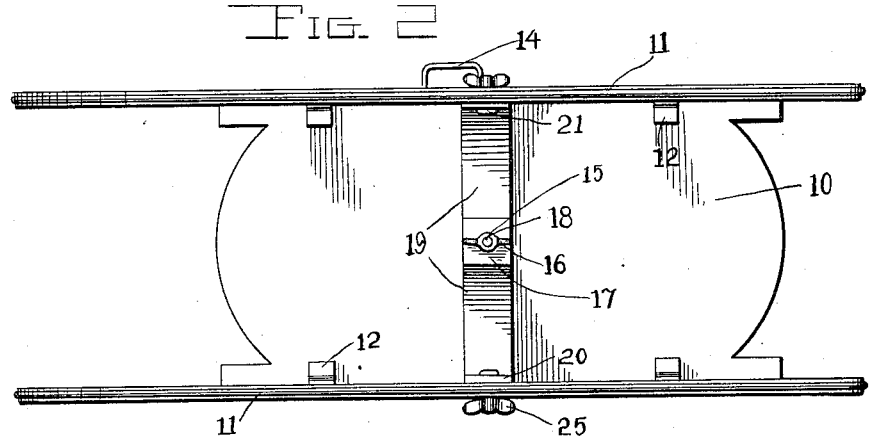
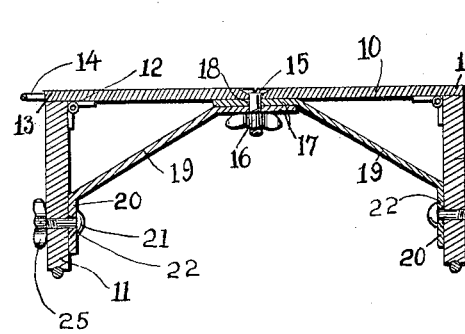
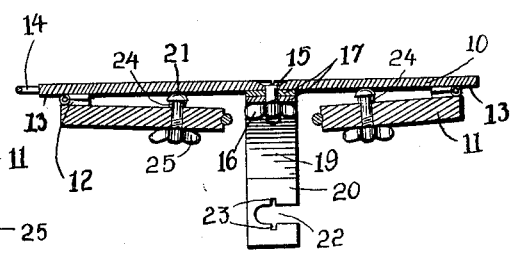
Witnesses
Frank S. Ratcliffe
Harry M. Test
Inventor
Oliver Crutchfield.
By Harry Ellis Chandler
Attorney
COLUMBIA PLANOGRAPH CO., WASHINGTON, D. C.

UNITED STATES PATENT OFFICE.

OLIVER CRUTCHFIELD, OF OTTUMWA, IOWA.

FOLDING SLED.

1,013,132. Specification of Letters Patent. Patented Jan. 2, 1912.

Application filed August 16, 1911. Serial No. 644,339.

*To all whom it may concern:*

Be it known that I, OLIVER CRUTCHFIELD, a citizen of the United States, residing at Ottumwa, in the county of Wapello and State of Iowa, have invented certain new and useful Improvements in Folding Sleds, of which the following is a specification.

This invention relates to improvements in sleds and has particular reference to a folding sled.

The principal object is to provide a simple and efficient means for holding the foldable runners in extended position.

Another object is to provide means for carrying the sled after it is folded.

These and other objects will be apparent from the following description and with particular reference to the accompanying drawings.

In the drawings: Figure 1 is a side elevation of the sled made in accordance with my invention. Fig. 2 is a bottom plan view. Fig. 3 is a vertical transverse section on the line 3—3 of Fig. 1. Fig. 4 is a similar section showing the sled folded.

Referring to the drawings, 10 represents the platform of the sled to which are secured the runners 11 by means of the hinges 12. The platform 10 extends outwardly on both sides over the upper edges of the runners as indicated at 13, and on one edge of said platform is provided a handle 14 for conveniently carrying the sled unfolded.

Extending downwardly through the approximate center of the platform 10 is a bolt 15, the head of which is adapted to lie flush with the upper face of the platform, the bolt having a winged nut 16 on its lower end to clamp the horizontal end portions 17 of the braces. The braces comprise the said horizontal portions 17 which are perforated at 18 and placed on the bolt 15, the downwardly and outwardly inclined portions 19, and the vertical runner engaging portions 20. Extending transversely through each of the runners is a bolt 21 which is engaged through an open ended slot 22 in the lower part of the portion 20, and near the inner end of the open ended slot is formed a pair of oppositely extending recesses 23 in which are adapted to be engaged the oppositely disposed lugs 24 directly beneath the head of the bolt 21, said bolt having a winged clamping nut 25 on its threaded end to fold the sled, the nuts 16 and 25 are first loosened, the latter being loosened enough to permit the wings or lugs 24 to be released from the recesses 23, when the braces may be swung to one side and nested together longitudinally along the center of the frame of the platform, when the runners may be folded inwardly on to the bottom of the platform. When so folded the sled may be readily carried by means of the handle 14.

What is claimed is:

A folding sled comprising a platform, runners hinged to the platform, braces beneath the platform and comprising horizontal portions pivoted to the platform, diagonal portions extending toward the runners, vertical portions engaging with the runners, said vertical portions having open ended slots and recesses on opposite sides of the slots, bolts extending transversely through the runners and engaged in the open ended slots clamping nuts on the bolts, and lugs on said bolts for engagement in said recesses, whereby when the nuts are tightened the braces are held in position and prevented from movement with relation to the bolts.

In testimony whereof I affix my signature, in the presence of two witnesses.

OLIVER CRUTCHFIELD.

Witnesses:
HERMAN DAVIS,
FRED L. EATON.

Copies of this patent may be obtained for five cents each, by addressing the "Commissioner of Patents, Washington, D. C."